United States Patent [19]

Koltisko, Jr. et al.

[11] Patent Number: 4,972,013

[45] Date of Patent: Nov. 20, 1990

[54] EMULSION BINDERS FOR JOINT COMPOUNDS

[75] Inventors: Bernard M. Koltisko, Jr., Emmaus; Tommy W. Hawkins, Bethlehem, both of Pa.

[73] Assignee: Air Products and Chemicals, Inc., Del.

[21] Appl. No.: 316,715

[22] Filed: Feb. 28, 1989

[51] Int. Cl.$^5$ .............................................. C08K 5/21
[52] U.S. Cl. ..................................... 524/211; 524/243
[58] Field of Search ................................ 524/211, 243

[56] References Cited

U.S. PATENT DOCUMENTS

| | | | |
|---|---|---|---|
| 3,250,748 | 5/1966 | Suzumura et al. | 524/211 X |
| 3,549,589 | 12/1970 | Meincke | 524/211 X |
| 3,891,453 | 7/1973 | Williams | 106/85 |
| 4,454,267 | 12/1982 | Williams | 524/43 |
| 4,629,751 | 4/1985 | Montgomery | 523/219 |
| 4,675,351 | 6/1987 | Brown | 524/211 X |
| 4,686,253 | 2/1986 | Struss et al. | 524/44 |
| 4,737,386 | 4/1988 | Wotier et al. | 524/511 X |
| 4,740,394 | 4/1988 | Mudge | 524/555 X |
| 4,767,816 | 8/1988 | Iacoviello et al. | 524/459 |

FOREIGN PATENT DOCUMENTS 0245718 4/1987 Fed. Rep. of Germany.

*Primary Examiner*—Joseph L. Schofer
*Assistant Examiner*—J. M. Reddick
*Attorney, Agent, or Firm*—Michael Leach; James C. Simmons; William F. Marsh

[57] ABSTRACT

A ready-mixed (wet) joint compound comprising a filler, binder, thickener, non-leveling agent and sufficient water to afford a viscosity that renders the joint compound usable, the binder consisting essentially of a polyvinyl alcohol-stabilized vinyl acetate/ethylene polymer emulsion, 0.1 to 10 wt % polyethoxylated tallow amine and 0.1 to 10 wt % urea, the wt % being based on emulsion solids.

16 Claims, No Drawings

EMULSION BINDERS FOR JOINT COMPOUNDS

TECHNICAL FIELD

The present invention relates to a joint compound for use in filling and coating the joints between adjacent gypsum wallboards, and more particularly, relates to joint compounds containing as a binder polyvinyl alcohol stabilized vinyl acetate polymer emulsions.

BACKGROUND OF THE INVENTION

Joint compounds, also known as tape joint cements, are used in the application of wallboard to fill the spaces between adjoining boards so as to provide a smooth seamless surface. The same joint compounds are used to cover the nails or other fasteners which affix the wallboard panel to its support elements so as to conceal the nail head and impart a continuously smooth appearance to the board.

Emulsions are commonly used as binders for ready-mixed (wet) joint compounds. Polyvinyl alcohol stabilized vinyl acetate-ethylene (VAE) copolymers and hydroxyethyl cellulose stabilized vinyl acetate homopolymers are the two most common types. The emulsions which often are the most costly portion of the formulation, play a key role in determining the performance properties of finished joint compounds. The properties, such as adhesion, viscosity and crack resistance, are controlled to a large extent by the level and choice of the emulsion binder.

A common problem encountered by workers applying the joint compounds is viscosity instability. A joint compound will build structure or "gel" within hours after production. The compound becomes highly thixotropic requiring vigorous hand or mechanical stirring to make the joint compound flow for application. At this point, a second viscosity-related problem is observed. It is hoped that with sufficient stirring, the viscosity of the joint compound will return to the value at which it was manufactured. However, an applicator may open a container produced several months in the past and find that the agitated viscosity has either decreased such that sag on application is noted, or increased such that water must be added to lower viscosity. Water addition will increase shrinkage and/or promote shrinkage cracking. Either condition will generally slow the work or require rework, resulting in higher application costs. As a result, a joint compound that does not require agitation before use and does not change in viscosity over time would be a strong economic benefit.

In addition, there is currently no emulsion binder that is able to impart high efficiency, excellent application properties and viscosity stability all at the same time. Polyvinyl alcohol stabilized vinyl acetate-ethylene copolymer emulsions offer excellent bonding efficiency at ambient and low temperatures, but they impart marginal application properties (trowelability), high air entrainment (low density) and thixotropy build upon aging. Vinyl acetate homopolymer-type binders (plasticized or unplasticized) impart improved application properties that suffer from reduced adhesion efficiency. They also exhibit poor low temperature binding characteristics and thixotropy build upon aging. Thus, it would be an economic advantage for both the applicator and manufacturer to use an emulsion binder which imparts excellent application properties, high viscosity, high ambient and low temperature binding efficiency and excellent viscosity stability to the joint compound formulation.

Attempts have been made to improve application properties or reduce air entrainment caused by polyvinyl alcohol stabilized VAE emulsions in the joint compound. It has been shown that it is extremely difficult to improve a single property without adversely affecting a second or third property. For example, joint compounds have been made with hydroxyethyl cellulose stabilized VAE copolymer emulsions with improved application properties, but sacrificed efficiency and viscosity stability. Air entrainment was reduced by addition of nonionic and anionic wetting agents but adhesion and trowelability were adversely affected.

The following references are representative of the state-of-the-art:

U.S. Pat. No. 3,891,453 discloses a joint compound which is preferably asbestos-free, for use in finishing joints between wallboards, comprising a filler, a binder, and two or all three of a water-holding agent; a slip-inducing colloid; and a non-swelling clay having sufficient pseudoplasticity to render the composition non-leveling.

U.S. Pat. No. 4,454,267 discloses a lightweight joint compound for use in finishing joints between gypsum wallboards, comprising a filler, a binder, a specially treated expanded perlite, a non-leveling agent, and a thickener.

U.S. Pat. No. 4,629,751 discloses a gel-resistant composition especially suited for filling, patching, or repairing plaster, gypsum wallboard panels and the like comprising a blend of glass microbubbles containing borate, high molecular weight polyhydroxy compound such as polyvinyl alcohol functioning as a binder, water, and low molecular weight polyhydroxy compound in which at least two of the hydroxyl groups are attached to carbon atoms that are separated by one or more intervening carbon atoms.

U.S. Pat. No. 4,686,253 discloses expanded perlite coated with a composition to render the perlite impervious to water, and a joint compound incorporating the same.

EP 0,245,718-A2 discloses joint compounds prepared using as binders therefor vinyl ester polymers prepared by conventional emulsion polymerization techniques employing, as the stabilizer therein, an acid converted or enzyme modified starch having water fluidity of 10 to 85.

SUMMARY OF THE INVENTION

The present invention provides a ready-mixed joint compound comprising a filler, a thickener, a non-leveling agent, binder composition and sufficient water to provide viscosity to render the joint compounds suitable for use. The binder composition consists essentially of a polyvinyl alcohol stabilized vinyl acetate/ethylene copolymer emulsion, 0.1 to 10 wt % alkoxylated tallow amine and 0.1 to 10 wt % urea, based on emulsion solids.

The emulsion binder provides improved viscosity stability on aging and reduces gel formation of joint compounds. The normally poor application properties and high air entrainment imparted by polyvinyl alcohol-stabilized emulsions are significantly improved without sacrificing other performance properties of the joint compounds.

DETAILED DESCRIPTION OF THE INVENTION

With regard to the joint compound of the present invention, the most important component is the vinyl acetate/ethylene (VAE) copolymer emulsion prepared by conventional aqueous emulsion polymerization of vinyl acetate and ethylene using a s stabilizing system up to about 10 wt %, based on vinyl acetate monomer, of a polyvinyl alcohol.

The primary monomer constituents are vinyl acetate and ethylene. The emulsions comprise 40 to 70 wt % copolymers containing at least 50 wt % vinyl acetate. The vinyl acetate and ethylene may be copolymerized with any conventionally employed comonomers. Suitable comonomers include vinyl esters of aliphatic carboxylic acids containing 3 to 20 carbon atoms., dialkyl esters of maleic and fumaric acid containing 1 to 8 carbon atoms in each alkyl group; and $C_1$-$C_8$ alkyl acrylates and methacrylates. These comonomers may be present in the emulsion copolymers at levels up to 10 wt % or more.

The emulsions are prepared using conventional pressure polymerization procedures wherein the monomers are polymerized in an aqueous medium in the presence of the polyvinyl alcohol using a free radical catalyst, the aqueous system being maintained by a suitable buffering agent, if necessary, at a pH of 2 to 7. If a batch process is used, the vinyl acetate under an ethylene atmosphere is suspended in water and thoroughly agitated while the aqueous medium is gradually heated to polymerization temperature. The homogenization period is followed by a polymerization period during which the free radical source which consists of an oxidizing agent and may include a reducing agent (redox system) is added incrementally or continuously. If a delay addition procedure is employed, the vinyl acetate and any optional comonomers are added gradually throughout the polymerization reaction. In either case, the polymerization is performed at conventional temperatures from about 10° to 85° C., preferably 45° to 60° C. for sufficient time to achieve a low vinyl acetate monomer content of less than 1.5%, preferably less than 0.5%. free vinyl acetate monomer.

The polymerization procedure for making the VAE copolymer emulsion is carried out under ethylene pressure of 10 to about 130 atm. using D polymerization procedures taught, for example, in U.S. Pat. Nos. 3,708,388; 3,714,099 and 4,164,488. The ethylene content of the copolymer depends on the ethylene content of the aqueous polymerization medium. The factors which control the ethylene content of the polymerization medium include the partial pressure of ethylene in the vapor phase over the medium, the temperature of the polymerization and the degree of mixing between the vapor phase and the liquid medium.

Various free-radical forming sources can be used in carrying out the polymerization of the monomers, such as peroxide compounds. Combination-type systems employing both reducing agents and oxidizing agents, i.e. a redox system, can also be used as are well known in the polymerization art. It is preferred to use hydrogen peroxide and/or t-butyl hydroperoxide in combination with ascorbic acid or erythorbic acid which avoids the introduction of formaldehyde to the emulsion.

The oxidizing agent is generally employed in a amount of 0.01 to 1 percent, preferably 0.05 to 0.5 percent, based on weight of vinyl acetate introduced into the polymerization system. The reducing agent is ordinarily added in an aqueous solution in the necessary equivalent amount.

The preferred polyvinyl alcohol stabilized vinyl acetate/ethylene copolymer emulsions used in the present invention are those emulsions of copolymers comprising 65 to 90 wt % vinyl acetate and 10 to 35 wt % ethylene, on a monomer basis, to provide a Tg ranging from about —20° to 20° C., preferably 0° to 10° C. Desirably the emulsions are about 55 to 65% solids.

The amount of stabilizing system used in the preferred polymerization reaction is about 3 to 8% based on the weight of vinyl acetate monomer and consists essentially of a mixture of a fully (at least 98 mole %) hydrolyzed polyvinyl alcohol and a partially (86–90 mole %) hydrolyzed polyvinyl alcohol and a nonionic polyalkoxylated surfactant. The fully and partially hydrolyzed polyvinyl alcohols should have a degree of polymerization ranging from 100 to 600. although small amounts of polyvinyl alcohol having a higher degree of polymerization can also be present.

The amount of the polyvinyl alcohol component of the stabilizing system used in the polymerization reaction is about 2.5 to 5 wt % based on vinyl acetate monomer. The relative amount of each type of polyvinyl alcohol that is used is in the range of 3:1 to 1:3 weight ratio of fully hydrolyzed to partially hydrolyzed polyvinyl alcohol, most desirably at a 1:1 weight ratio.

In addition to the polyvinyl alcohol component the stabilizing system also contains a nonionic polyoxyalkylene condensate surfactant (polyalkoxylated surfactant) in an amount ranging from 0.5 to 3 wt %. based on vinyl acetate. The preferred nonionic surfactants are the nonylphenoxy poly(ethyleneoxy) ethanols having about 30 ethylene oxide units.

Such polyvinyl alcohol stabilized vinyl acetate-ethylene copolymer emulsions and the procedure for their manufacture are described in U.S. Pat. No. 4,735,986 which is incorporated by reference. Such a copolymer emulsion is marketed as Airflex CA-52 emulsion by Air Products and Chemicals, Inc.

In addition to the vinyl acetate polymer emulsion the binder also contains 0.1 to 10 wt % ethoxylated tallow amine and 0.1 to 10 wt % urea, based on emulsion solids.

The ethoxylated tallow amine improves the 'slip'or application properties of the joint compound, i.e. a slip-inducing agent. It acts as an interparticle lubricant which reduces drag during troweling. Too high a level results in poor adhesion. Thus a preferred range is 1 to 5 wt %. The ethoxylated tallow amine may contain from 1 to 30 ethylene oxide (EO) units, preferably about 3 to 15 EO units, and most preferably about 5 EO units. Contemplated as the functional, or operative, equivalent of the ethoxylated tallow amine for purposes of this invention are alkoxylated (ethyleneoxy and/or propyleneoxy ($C_8$–$C_{22}$ fatty amines.

The urea is preferably used in an amount of 1 to 3 wt % based on the emulsion solids. It is believed the urea reduces the large viscosity buildup upon aging that is observed from the combination of the emulsion and ethoxylated tallow amine compound. The urea appears to interfere with the hydrogen bonding in the joint compound which is responsible for the buildup of "structure" or "gel". Urea also extends open time by acting as a humectant. However, too high a level can result in poor bonding. Contemplated as the functional, or operative, equivalent of the urea for purposes of this invention are simple urea derivatives (alkylureas) and low molecular weight amines and amides.

This combination of additives allows polyvinyl alcohol-stabilized vinyl D acetate-ethylene copolymer emulsions to be used in commercially acceptable lightweight joint cement formulations. Previously, such polyvinyl alcohol stabilized emulsions were found to be inadequate in lightweight formulations and not commercially acceptable. The present combination of additives and polyvinyl alcohol-stabilized VAE emulsion is superior to hydroxyethyl cellulose-stabilized VAE emulsions and vinyl acetate homopolymer emulsions especially when used in formulations containing expanded silica or glass microbubbles.

The remaining components in the joint compounds of the invention are those conventional in the art.

Any common filler disclosed in the art may be utilized, such as calcium carbonate. Other fillers which may be used are calcium sulfate dihydrate and calcium sulfate hemihydrate. In addition, mica, talc, pyrophylite, diatomaceous earth, and clay such as kaolinite may be used together with the primary fillers. The filler is generally used in these compounds in amounts of about 80 to 95 wt %. based on solids.

Non-leveling agents such as attapulgus clay are present in the joint compound. Other non-leveling agents are mixtures of amylopectin starch together with various modified clays in a ratio of 5:1. Still other non-leveling agents which can be used are various bentonites. The non-leveling agents impart certain rheological properties to the joint compounds such as thixotropy.

Another material required in a joint compound is a thickener. Among the common thickeners are hydroxypropyl methyl cellulose, methyl cellulose, D hydroxyethyl cellulose, hydroxyethyl methyl cellulose and sodium carboxymethyl cellulose. The thickeners may be used alone or in combination with one another.

Addition ingredients generally utilized in joint compounds are preservatives, wetting agents, defoamers and plasticizers.

EXAMPLE 1

The described procedure is the preferred method for preparing a vinyl acetate-ethylene copolymer emulsion used in the joint compound.

The following ingredients are added to a 30 gal pressure reactor:

| | |
|---|---|
| Water | 12,500 g |
| Vinol 205[a] (20% soln) | 4,800 g |
| Vinol 107[b] (20% soln) | 4,800 g |
| Igepal CO-887[c] | 1,600 g |

[a] 87-89 mole % hydrolyzed PVOH DP = 550; Air Products and Chemicals, Inc.
[b] 98+ mole % hydrolyzed PVOH DP = 400; Air Products and Chemicals, Inc.
[c] Nonylphenoxy poly(ethyleneoxy)ethanol of HLB = 17.2 (70% solution of Igepal CO-880); GAF Corp.

After mixing the above ingredients, 4g ferrous ammonium sulfate in 4,674 g water are added and mixed. Then 60g phosphoric acid in 400g water are added yielding a reaction medium having a pH of about 3.2. To this polymerization reaction medium is added 54,480 g vinyl acetate monomer.

The reaction vessel is agitated at 350 rpm and the reaction temperature brought to 35° C. Ethylene is added to a pressure of 500 psig. Next, 150g of a 4% aqueous erythorbic acid solution is added to the polymerization reactor. (The erythorbic acid solution comprises 130g erythorbic acid, 28g of 29% aq. ammonium hydroxide and 3092g water).

The polymerization reaction is initiated with 20g of a 2% hydrogen peroxide solution. (The hydrogen peroxide solution comprises 200g of 35% aq. hydrogen peroxide and 3300g water). Upon initiation, the erythorbic acid solution is added over a 4 hour period. The hydrogen peroxide solution is also added over the 4 hour period with the exception that the hydrogen peroxide solution is added in a manner to control the polymerization reaction temperature at 55° C., with a reaction vessel jacket temperature of 30° C. The reactor temperature is allowed to rise from the initial temperature of 35° C. to 55° C. over a period of approximately 1 hour. At the end of the first hour of polymerization the reactor pressure is raised to 750 psig and maintained at this pressure with ethylene make-up until the vinyl acetate free-monomer content is about 7%. Ethylene make-up is then discontinued and the reactor pressure allowed decay. At the end of the 4 hours of polymerization, the vinyl acetate free-monomer content is approximately 1.5%. The emulsion is cooled to 35° C. and transferred to a degasser. The vinyl acetate free-monomer content is reduced below 0.5% by the simultaneous addition over a one hour time period of 2100g of a 8% aqueous t-butyl hydroperoxide solution and 2520g of a 10% erythorbic acid solution.

To this emulsion product is added about 4,285 g of a 1:1 blend of urea and Chemeen T-5 ethoxylated (5EO's) tallow amine and the pH adjusted to 2.5 to 4.0.

In the following examples, the binder emulsions were as follows:

A—a standard PVOH-stabilized VAE emulsion (AIRFLEX 526*)
B—a high solids PVOH stabilized VAE emulsion (CA-52*)
C—HEC-stabilized VAE emulsion (AIRFLEX 525*)
D—HEC-stabilized, plasticized vinyl acetate homopolymer emulsion (Ucar 131**)

*Emulsion from Air Products and Chemicals, Inc.
**Emulsion from Union Carbide Corp.

EXAMPLE 2

In this example, a typical lightweight joint compound formulation was used to evaluate emulsion binder compositions.

| Lightweight Joint Formulation | Parts by Weight |
|---|---|
| Dry Blend (inorganic filler, expanded silica and thickener) | 51.4 |
| Water | 45.3 |
| Emulsion (solids) | 3.2 |
| Biocide | 0.1 |

TABLE 1

| Run | 1 | 2 | 3 | 4 |
|---|---|---|---|---|
| Binder | B | B | C | C |
| ETA[a] (%)* | 0 | 4.2 | 0 | 4.2 |
| Density (lb/gal) | 9.2 | 9.7 | 9.6 | 9.5 |
| Initial Viscosity (cps., × 10³) | 174 | 177 | 171 | 158 |
| Workability[b] | good | excellent | good | fair |
| Consistency[c] | fair | excellent | excellent | good |

TABLE 1-continued

| Run | 1 | 2 | 3 | 4 |
|---|---|---|---|---|
| Adhesion (% fiber tear) | 85 | 90 | 90 | 90 |

*Ethoxylated tallow amine EO = 5 (Chemeen T-5 from Chemax, Inc.)
*Rated as defined in EP 0 245 718 A2
*Subjective appearance of joint compound. Excellent - joint compound has a glossy, light, creamy texture. Poor - a dry, heavy, grainy texture. Fair to good - intermediate ratings.
*Based on binder solids The information in Table 1 shows that the addition of ethoxylated tallow amine to a PVOH/VAE copolymer emulsion binder in a lightweight joint cement formulation improved the workability and consistency of the Joint compound in contrast to detrimentally affecting these properties when added to an HEC/VAE copolymer emulsion binder.

EXAMPLE 3

The following standard Joint cement formulation was used to evaluate emulsion binder compositions.

| Standard Formulation | Parts by Weight |
|---|---|
| Dry Blend (inorganic filler and thickener) | 66.5 |
| Water | 31.9 |
| Emulsion (solids) | variable |
| Biocide | 0.1 |

TABLE 2

| Run | 5 | 6 | 7 |
|---|---|---|---|
| Binder | A | B | D |
| ETA (%)* | 0 | 1.5 | 0 |
| Urea (%)* | 0 | 1.5 | 0 |
| Binder (%)** | 2.2 | 2.2 | 2.8 |
| Density (lb/gal) | 13.8 | 13.9 | 14.0 |
| Workability | Fair | Excellent | Excellent |
| Consistency | Good | Excellent | Excellent |
| Adhesion | | | |
| @ 73° F. | — | 90 | 95 |
| @ 43° F. | — | 25 | 0 |
| Viscosity (unstirred/stirred)$^a$ | | | |
| Initial (cps × 10³) | —/174 | —/174 | —/177 |
| 2 Week @ 73° F. | 230/160 | 200/160 | 294/145 |
| 2 week @ 120° F. | 258/106 | 237/112 | 317/92 |
| 4 week @ 73° F. | 228/158 | 185/145 | 280/140 |

$^a$New sample for each measurement. Brabender viscosmeter set at 5 rpm to measure peak viscosity of unstirred joint compound. After this measurement, joint compound vigorously stirred and viscosity measured at 75 rpm.
*Based on binder solids.
*Based on total solids in joint composition.

Table 2 shows that a PVOH/VAE copolymer emulsion binder containing ethoxylated tallow amine and urea (Run 6) provides a joint compound with excellent appearance, workability and better efficiency than the industry standard Run 7. The viscosity data shows the good viscosity stability of Run 6, like Run 7. and also the reduced aged thixotropy of Run 6 compared to Run 7.

STATEMENT OF INDUSTRIAL APPLICATION

The present invention provides an emulsion joint compound binder that provides a Joint compound having improved viscosity stability and reduced thixotropy.

We claim:

1. In a joint compound comprising a filler, binder, thickener, non-leveling agent and sufficient water to provide a viscosity that renders the joint compound usable, the improvement which comprises a binder consisting essentially of a polyvinyl alcohol-stabilized vinyl acetate/ethylene copolymer emulsion, an ethoxylated tallow amine and urea.

2. The joint compound of claim 1 in which the ethoxylated tallow amine contains 1-30 ethyleneoxide units and is present at 0.1-10 wt. %, based on emulsion solids.

3. The joint compound of claim 2 in which the ethoxylated tallow amine contains 3-15 ethyleneoxide units and is present at 1-5 wt. %, based on emulsion solids.

4. The joint compound of claim 1 in which urea is present at 0.1-10 wt %, based on emulsion solids.

5. The joint compound of claim 1 in which the vinyl acetate/ethylene copolymer emulsion is prepared in the presence of up to 10 wt % polyvinyl alcohol, based on vinyl acetate monomer.

6. The joint compound of claim 4 in which the urea is present at 1-3 wt %, based on emulsion solids.

7. A binder composition for a joint compound which consists essentially of
   (a) a polyvinyl alcohol stabilized vinyl acetate/ethylene copolymer emulsion.
   (b) 0.1 to 10 wt % alkoxylated tallow amine, and
   (c) 0.1 to 10 wt % urea, the wt % based on emulsion solids.

8. The binder composition of claim 7 in which the alkoxylated tallow amine contains about 1-30 ethyleneoxide units.

9. The binder composition of claim 7 in which the alkoxylated tallow amine contains 3-15 ethyleneoxide units and is present at 1-5 wt %.

10. The binder composition of claim 7 in which the urea is present at 1-3 wt %.

11. The binder composition of claim 7 in which the vinyl acetate/ethylene copolymer emulsion is prepared in the presence of up to 10 wt % polyvinyl alcohol, based on vinyl acetate monomer.

12. A binder composition for a joint compound which consists essentially of
   (a) a polyvinyl alcohol-stabilized vinyl acetate/ethylene copolymer emulsion, the emulsion containing about 40-70 wt % of a copolymer consisting essentially of 65-90 wt % vinyl acetate and 10-35 wt % ethylene and prepared by aqueous emulsion polymerization in the presence of a stabilizing system consisting essentially of 2.5-5 wt % (based on vinyl acetate monomer) of a mixture of an at least 98 mole % hydrolyzed polyvinyl alcohol and a 86-90 mole% hydrolyzed polyvinyl alcohol, the polyvinyl alcohols having a degree of polymerization ranging from 100 to 600, and 0.5 to 3 wt % (based on H vinyl acetate monomer) of a nonionic polyalkoxylated surfactant,
   (b) 1-5 wt % ethoxylated tallow amine containing 3-15 ethylene oxide units, and
   (c) 1-3 wt % urea.

13. The binder composition of claim 12 in which the nonionic surfactant is a nonylphenoxy poly(ehyleneoxy) ethanol having about 30 ethylene oxide units.

14. The binder composition of claim 13 in which the polyvinyl alcohols are in a weight ratio range of 3:1 to 1:3.

15. The binder composition of claim 14 in which the polyvinyl alcohol weight ratio is about 1:1.

16. The binder composition of claim 15 in which the ethoxylated tallow amine contains about 5 ethylene oxide units.

* * * * *